United States Patent [19]
Crabtree et al.

[11] Patent Number: 5,509,063
[45] Date of Patent: Apr. 16, 1996

[54] METHOD OF CONTROLLING A TELECOMMUNICATIONS NETWORK USING CALL GAPPING

[75] Inventors: Ian B. Crabtree, Suffolk; Charles A. Swaine, Shropshire, both of England

[73] Assignee: British Telecommunications public limited company, London, England

[21] Appl. No.: 173,112

[22] Filed: Dec. 27, 1993

Related U.S. Application Data

[63] Continuation-in-part of Ser. No. 899,989, Jun. 17, 1992, abandoned, and Ser. No. 899,678, Jun. 17, 1992, abandoned.

[30] Foreign Application Priority Data

May 12, 1992 [GB] United Kingdom .................. 9210172
May 12, 1992 [GB] United Kingdom .................. 9210173

[51] Int. Cl.$^6$ .................................................. H04M 7/00
[52] U.S. Cl. .......................... 379/221; 379/270; 379/113
[58] Field of Search ................................ 379/113, 134, 379/220, 221

[56] References Cited

U.S. PATENT DOCUMENTS

| | | | |
|---|---|---|---|
| 4,455,455 | 6/1984 | Little | 379/203 |
| 4,704,724 | 11/1987 | Krishnan et la. | 379/221 |
| 4,756,019 | 7/1988 | Szybicki | 379/112 |
| 4,788,721 | 11/1988 | Krishnan et al. | 379/221 |
| 4,979,118 | 12/1990 | Kheradpir | 379/220 |
| 5,060,258 | 10/1991 | Turner | 379/134 |
| 5,068,892 | 11/1991 | Livanos | 379/221 |

FOREIGN PATENT DOCUMENTS

| | | |
|---|---|---|
| 0490446 | 6/1992 | European Pat. Off. . |
| 0496061 | 7/1992 | European Pat. Off. . |

OTHER PUBLICATIONS

Crabtree et al, "Advanced Information Processing in Traffic Management", BR Telecom Technology, vol. 9, 3 Jul. 1991, pp. 34–42.

Tokunaga et al, "Traffic Congestion Control Based on Call-Density Control", Electronics & Communications In Japan, Part I—Communications, vol. 72, No. 5, May 1989, New York, US, pp. 96–107.

Stach, "Graph Analysis and Rule Based Paradigms for the Identification, Containment and Clearing of Switch Congestion in Non–Hierarchical", Proceedings Of The National Communications Forum, vol. 43, No. 2/4, Oct. 1989, Chicago, pp. 474–482.

Turner et al, "A New Call Gapping Algorithm for Network Traffic Management", Proceedings Of The 13th International Teletraffic Congress ITC13; 19 Jun. 191, Copenhagen, pp. 121–126.

Stacey et al, "Dynamic Alternative Routing in the British Telecom Trunk Network", International Switching Symposium, vol. 4, 15 Mar. 1987, Phoenix, pp. 984–988.

Wolf, "Advanced Techniques for Managing Telecommunications Networks", IEEE Communications Magazine, vol. 28, No. 10, Oct. 1990, New York, pp. 76–81.

(List continued on next page.)

*Primary Examiner*—Jeffery Hofsass
*Assistant Examiner*—Daniel S. Hunter
*Attorney, Agent, or Firm*—Nixon & Vanderhye

[57] ABSTRACT

In a telecommunications network, such as the public switched telephone network, account must be taken of faults which can occur in the network. For instance, on occurrence of a local exchange failure, it is known to apply control such as route gapping and code blocking. The invention is concerned with detection of failure of a local exchange (116, 118) in a communications network. It relies on a combination of parameters, each parameter in the combination having to meet predetermined criteria. In particular, a local exchange failure is recognized when the Bids per Circuit per Hour (BCH) along selected traffic routes exceed a first threshold and the magnitude of a decrease in the average Answer Seizure Ratio (ASR) on selected traffic routes exceeds a second threshold. Controls might be applied to parent or far-end trunk exchanges, and can be removed when the ASR and Percentage Occupancy (OCC) meet further criteria.

28 Claims, 2 Drawing Sheets

OTHER PUBLICATIONS

Haenschke et al, "Network Management and Congestion in the U.S. Telecommunications Network", IEEE Transactions On Communications, vol. 29, No. 4, Apr. 1981, pp. 376–385.

Chemouil et al, "Integrated Network Management and Control", Computer Networks And ISDN Systems, vol. 20, No. 1/5, Dec. 1990, Amsterdam, pp. 143–153.

Pham, "Control Loop for Traffic Management of Network Under Focussed Overloads", Proceedings Of The 13The International Teletraffic Congress ITC13, 19 Jun. 1991, Copenhagen, pp. 315–322.

Langlois et al, "Dynamic Congestion Control in Circuit–Switched Telecommunications Networks", Proceedings Of The 13The International Teletraffic Congress ITC13; 19 Jun 1991, Copenhagen, pp. 127–132.

Passeron, "Network Supervision and Management", Commutation & Transmission, vol. 13, No. SPEC, 1991, Paris, pp. 45–52.

Mase et al, "Advanced Traffic Control Methods for Network Management", IEEE Communications Magazine, vol. 28, No. 10, Oct. 1990, New York, pp. 82–88.

Ackerly, "Overall Grade–for Service Models for the British Telecom Network", Proceedings Of The 12The International Teletraffic Congress ITC12, vol. 1, Jun. 1988, Torino, pp. 16–17.

METHOD OF CONTROLLING A TELECOMMUNICATIONS NETWORK USING CALL GAPPING

CROSS-REFERENCES TO RELATED APPLICATIONS

This is a continuation-in-part of applications Ser. Nos. 07/899,989 and 07/899,678, both filed Jun. 17, 1992, both now abandoned. This is also a continuation of PCT application No. PCT/GB93/00972 filed May 12, 1993 with a designation of the United States.

BACKGROUND OF THE INVENTION

1. Field of the Invention

This invention relates the control of a telecommunications network which includes at least one local exchange connected by routes to one or more parent trunk exchanges leach being one of a plurality of trunk exchanges interconnected by trunk routes and to telecommunications networks so controlled. It is particularly concerned with the detection of focused overloads in such networks.

2. Related Art

Commonly a local exchange is associated with a home exchange, through which incoming calls to the local exchange are routed, and a security exchange, through which outward calls from the local exchange are routed, in normal operation. The security exchange is so called because it can also be used to route incoming calls to the local exchange if the home exchange fails. The security and home exchanges are collectively referred to as the parent exchanges of the local exchange. Exchanges other than the parent exchanges are referred to as far-end trunk exchanges of the local exchanges.

Near real-time network traffic management (NTM) is an essential component of network management if optimal traffic performance in terms of call throughput is to be ensured. To give an indication of the volume of traffic which may be involved, BT's trunk network in the United Kingdom currently handles approximately six million call attempts per hour during the busy periods which is equivalent to 1,700 call attempts per second. Given such a volume of traffic it is essential that any network difficulties are detected and controlled as quickly as possible. For example, difficulties are often encountered by network traffic managers due to abnormal traffic patterns which can be caused by events such as phone-ins, tele-votes and public holidays (for example Christmas Day and New Year's Eve/Day). In all these cases traffic in the network varies widely from the normal level, sometimes quite spectacularly, and the network must be controlled to maintain the best overall network performance.

With the introduction of digital switches such as System X it is possible to monitor closely the performance of each exchange and the routes between them and to the subscribers. BT's Network Traffic Management System (NTMS) currently receives statistics on upwards of 37,000 routes from 490 exchanges in the UK every five minutes, which measurement period was chosen to be a long enough period to be able to obtain a statistically reliable measurement of the network performance whilst being short enough to allow effective real-time control of the network.

The information received by the NTMS is processed to provide CCITT recommended parameters. The parameter values are compared with thresholds to determine if any difficulties exist on the monitored network elements.

Usually the first indication of a network problem is when an 'exception' is displayed on a wall-board, or on a graphical interface at an individual manager's workstation, at a Traffic Management Center. Exceptions are those parameter values, calculated from network element measurements, which deviate sufficiently from a predetermined threshold for that value. The exceptions are ranked in a priority order with the top 20 displayed. However, due to the manner in which the thresholds are set by the network traffic managers, some exceptions do not necessarily indicate a difficulty as thresholds are percentage-based and set a value which ensures all potential difficulties are captured. This results in exceptions being displayed that are occasionally spurious or insignificant. The exceptions therefore need to be examined in more detail to determine if a real difficulty exists and whether it warrants any action. To help in this activity several information sources are currently used by the network traffic managers.

The NTMS provides near real-time surveillance and monitoring of the network's status and performance. It provides the network traffic managers with information to enable them to take prompt action to control the flow of traffic to ensure the maximum utilization of the network in all situations. The NTMS allows network traffic managers to look at the raw statistics as well as derived generic parameters and to compare traffic patterns over the last few measurement periods to isolate any trends.

An On-Line Traffic Information System (OTIS) takes the measurement of statistics from the NTMS system and processes them to provide summarised historical data for daily and weekly traffic patterns. This system allows the network traffic managers to examine historical traffic patterns to detect any radical shifts in traffic.

A data management system provides the network traffic managers with an up-to-date copy of the routing tables at all trunk exchanges. This information is used to check the routes to which calls can be routed, which controls are in force and the routing algorithms being used.

There is also a broadcast speaker facility which connects the world-wide network management center to all the regional centers.

Once a potential difficulty has been detected, acknowledged and analyzed, it is characterised and a decision made whether to control it using the available range of expansive and restrictive controls to either allow alternative traffic paths through the network or to restrict and block call attempts to particular areas, respectively. The situation must then be monitored to ensure the controls are having the desired effect and that they are removed as soon as a problem has been dealt with effectively.

It is important that the controls applied are sufficient to suppress the problem yet not so severe that they cause their own problems by congesting other parts of the network or by blocking potentially successful calls.

One class of exception associated with telecommunications networks is the focused overload. The All Circuits Engaged (ACE) CCITT parameter may be monitored in order to determine when a focused overload occurs but this has been found to be not very satisfactory at present and will be less so in the near future when call failures will only be shown (on a wallboard) with respect to the last of several routes tried. Currently, all the routes tried are shown and focused overloads give rise to a graphic "star" effect on a wallboard.

SUMMARY OF THE INVENTION

According to a first aspect of the present invention, a method of controlling a telecommunications network, which includes at least one local exchange connected by routes to one or more parent trunk exchanges each being one of a plurality of trunk exchanges interconnected by trunk routes, is characterised in that the method comprises applying focused overload controls to the trunk exchanges of the network when the Bids per Circuit per Hour (BCH) along the primary traffic routes from a parent trunk exchange to the local exchange exceed a first threshold and the magnitude of a decrease in the average Answer Seizure Ratio (ASR) on the trunk primary traffic routes to the parent exchange over a measurement period exceeds a second threshold.

A primary traffic route is the route first tried for a call in a network, all alternative routes then being secondary.

The BCH parameter gives a normalised indication of the number of call attempts down a particular route and will generally stay at a normal value well below the maximum BCH that can be handled by the exchanges under normal conditions but will tend to move to and above that value during a focused overload. These normal values provide a maximum expected BCH range of the routes in the network.

The BCH will also rise due to an increase in country-wide traffic to a large number of subscribers served by a given local exchange, for example when a disaster befalls an area, but this will not necessarily result in a focused overload if a sufficiently high number of calls continue to be connected. The inclusion of the test of the ASR in the present invention serves to distinguish between these two scenarios. In the event of a focused overload it has been determined by the applicant that the average ASR on the trunk primary traffic routes into the home exchange drops very sharply and can remain low for a number of five minute measurement periods before slowly returning to its normal value whereas a general increase in traffic to a local exchange does not have this effect.

The first threshold can be set according to the normal maximum expected value of the BCH parameter on the route that can be properly handled by the network. It has been found that in a focused overload the BCH parameter rises very sharply reaching a peak in the first five minutes followed by an exponential drop to the normal level over the following forty minutes. The maximum expected value of Seizures per Circuit per Hour (SCH) is approximately 60 divided by the average call length which at 2 to 3 minutes gives a normal maximum expected BCH for BT's UK network of about 20 to 30 with the normal value at most about 10.

To provide for the proper application of control to the parent exchanges it is preferable that the first threshold is towards the high end of the above maximum expected BCH range. In this case a value of 30 can be used.

The ASR has been found to drop very sharply in the event of a sudden focused overload and it remains low for about 15 minutes before slowly returning to its normal value. The second threshold can therefore be conveniently set equal to the normal daily excursion which for BT's UK network is approximately 10%. A 10% drop in the average Answer Seizure Ratio (ASR) on the trunk primary traffic routes into the home exchange over a single measurement period is very significant and can therefore be used to detect the focused overload condition.

If it is desired to apply focused overload controls only when there is a national problem, caused by a national telephone appeal rather than a local announcement for example, focused overload controls can be applied to the trunk exchanges of the network only when the increase in the average value of the BCH along the trunk primary traffic routes into the respective parent exchange over a measurement period exceeds a third threshold.

Analysis of focused overloads in BT's UK network shows that a third threshold value of 40% greater than the long term BCH average over all the trunk primary traffic routes into the home exchange will generally be satisfactory but exceptions may occur occasionally at moments of normal traffic increase for example between 08.00 and 09.00 hours and just before the cheap rate period. The third threshold is preferably set to a value large enough to usually avoid false indications of a problem or raised at times of a normal increase in traffic to increase the sensitivity and reliability of the test generally.

A network may be controlled according to the present invention by an apparatus to which is input the network parameters and which provides control information to the network controller when the focused overload condition has been detected so that the network manager can apply the method of the present invention to the network. Alternatively the network can be controlled automatically on detection of the focused overload to apply the method of the present invention without the intervention of a network manager.

The focused overload controls to be applied to the network may be call gapping applied to the home trunk exchanges or to one or more of the far-end trunk exchanges of the local exchange, for example.

It is also useful if a determination can be made readily of when the focused overload controls can be removed, ie that the focused overload problem has been overcome. It has been found that it is satisfactory to remove the focused overload controls once the BCH from the home exchange to the local exchange falls below a fourth threshold, which threshold is preferably 5. Once it has been determined that the focused overload controls can be removed, the focused overload controls applied to the exchanges of the network are removed either by a network manager or automatically by a network controlling apparatus. In this way local focused overload controls can be overridden once it has been determined globally that the problem has been solved.

According to a second aspect of the present invention, there is provided a method of controlling a network, which includes at least one local exchange connected by routes to one or more parent trunk exchanges each being one of a plurality of trunk exchanges interconnected by trunk routes, in which call gapping is applied to one or more of the exchanges of the network on detection of a focused overload at an exchange, the method being characterised in that call gapping of numbers of a local exchange is applied either:

a) to an associated parent exchange whenever the Bids per Circuit per Hour (BCH) from the parent exchange to the local exchange is greater than a fifth threshold and the Answer Seizure Ratio (ASR) on primary traffic routes from the parent exchange to the local exchange has stayed below a sixth threshold for the duration of a measurement period; or b) to a far-end trunk exchange of the local exchange whenever the ASR from the far-end trunk exchange to a parent trunk exchange of the local exchange has stayed below a seventh threshold for the duration of a measurement period.

A method according to the second aspect of the present invention can be used advantageously, whether or not in combination with a method according to the first aspect of the present invention. The advantage lies in the increased flexibility available. If call gapping is applied to the home trunk exchange, it has effect on all routes in to that home trunk exchange for the local exchange. If it is applied at the far-end trunk exchanges, it is possible to select one or more of the far-end trunk exchanges which is or are contributing heavily to the focused overload, and call gap only that one exchange, or those selected trunk exchanges.

When applying call-gapping to one or more of the far-end trunk exchanges, a less sensitive test than that used for the application of local focused overload controls has been found to be appropriate. The seventh threshold can conveniently be set to be about equal to the average normal ASR for exchanges in the network so the exchanges are regulated to allow the associated ASRs to move back to this value.

Clearly, the fifth, sixth and seventh thresholds will in general need to be determined by analyzing the normal values for the particular network to be controlled in accordance with the above general principles.

The local controls are preferably removed progressively as the problem is resolved at different parts of the network. In particular it is preferable that the call gapping is removed from a parent trunk exchange once the ASR and Percentage Occupancy (OCC) have stayed above an eighth threshold and below a ninth threshold, respectively, for the duration of a measurement period. (The percentage occupancy is the total traffic in Erlangs, divided by the number of in-service circuits on a route.) The eighth and ninth thresholds can be set to equal the highest normal ASR and OCC for exchanges in the network which for BT's UK network are in the order of 80% and 60%, respectively.

The call gapping is preferably applied to a far-end trunk exchange until the ASR to the home exchange has stayed above the eighth threshold for the duration of a measurement period.

The extent of call gapping applied can be a fixed amount, for example 5 second call gapping, but will preferably be selected according to the prevailing conditions based on prior knowledge of the call handling capability of the subscriber being called or from general experience of the network manager.

Various values of the thresholds can be selected according to the characteristics of the particular network to which the present invention is to be applied. If the normal time variation of the parameters being monitored is known, the threshold values could be adjusted accordingly to provide a more consistent alert of a focused overload and to reduce the chance of a normal increase in traffic triggering a false indication of a problem.

BRIEF DESCRIPTION OF THE DRAWINGS

Embodiments of the invention will now be described by way of example only with reference to the accompanying drawings of which.

DETAILED DESCRIPTION OF EXEMPLARY EMBODIMENTS

Figure 1:
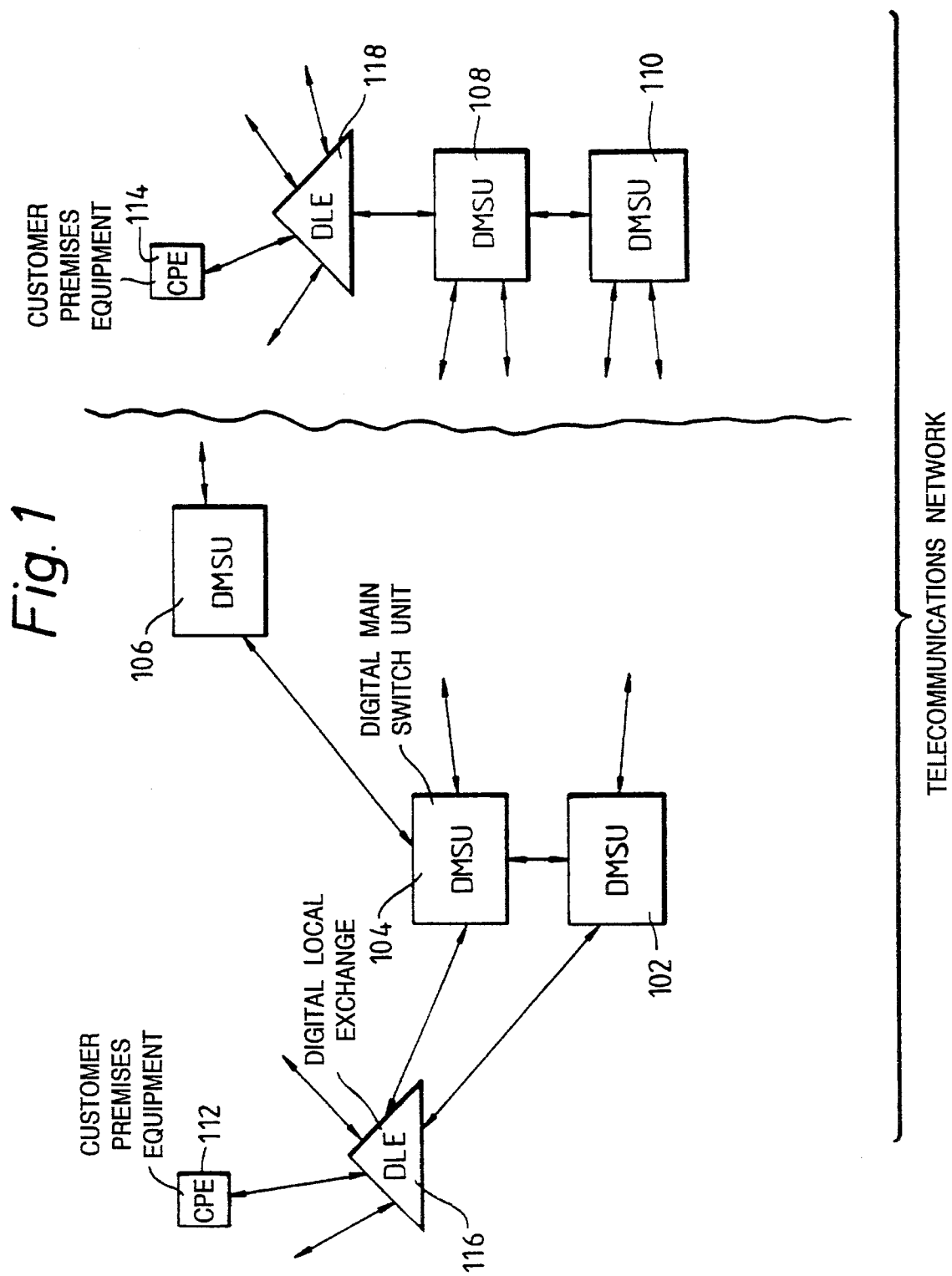
FIG. 1 is a schematic representation of a network controllable by the method of the present invention.

Referring to FIG. 1 a telecommunications network comprises a number of digital main switch units (DMSUs)— trunk exchanges—of which only five are shown for clarity and are referenced 102, 104, 106, 108 and 110. Subscribers' customer premises equipment, of which only two are shown referenced 112 and 114, are connected to the trunk exchanges 102 to 110 via respective digital local exchange (DLE) 116 and 118.

The DLE 116 is connected to the DMSU 102 through which incoming calls to the subscribers attached to the DLE 116, including subscriber 112, are routed. The DMSU 102 is commonly referred to as the home trunk exchange for the DLE 116. The DLE 116 is also connected to the DMSU 104 through which outgoing calls from the DLE are routed. This is usually called a security exchange as incoming calls to the exchange 116 can be routed through it should the DMSU 102 fail.

Similarly, the DMSU 108 is the home exchange for the digital local exchange 118.

The home and security exchanges associated with a DLE are collectively referred to as the parent exchanges of that DLE.

Those exchanges other than the parent exchanges are referred to as the far-end trunk exchanges of a given digital local exchange. For the network of FIG. 1 all exchanges other than trunk exchanges 102 and 104 are regarded as far-end trunk exchanges for the digital local exchange 116, for example.

If a large number of calls are attempted to a subscriber 112 within too short a period the digital local exchange 116 may not be able to handle the calls and in extreme cases the DLE might also go into overload. This will block unrelated traffic in the area around the destination exchange. This is what is called a focused overload which needs to be controlled if congestion is to be avoided.

A particular method of controlling a telecommunications network such as that illustrated in FIG. 1 will now be described with additional reference to FIG. 2 which shows a network control system implementing the method of the present invention.

Figure 2:
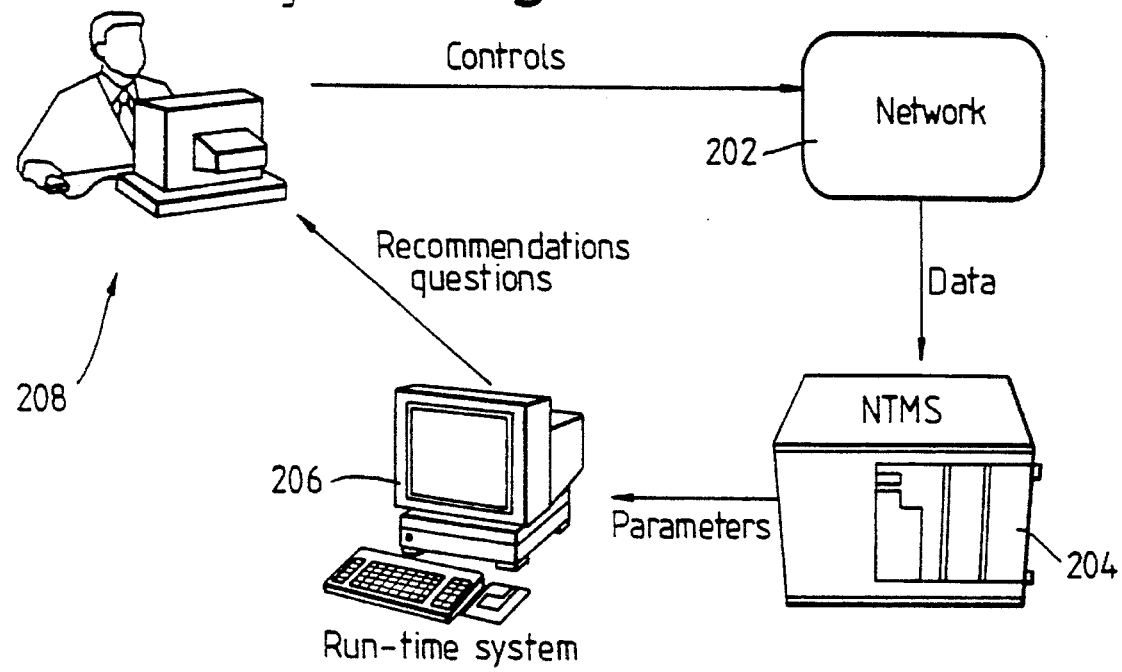
FIG. 2 is a schematic representation of a control system for implementing the method of the present invention.

Referring to FIG. 2 the network of FIG. 1 is denoted by box 202. Every five minutes, which is the measurement period of the network of FIG. 1, a set of statistics is generated by the digital exchanges of the network 202 which is processed by an NTMS system 204 to provide generic measurement values including those of the CCITT recommendation. These parameters are input to a run-time system 206 which applies rules to the received parameters from the NTMS 204 by means of an appropriately coded expert system. The run-time system 206 provides recommendations to aid a network traffic manager 208 to detect and control focused overload problems in the network 202 according to embodiments of the present invention.

The run-time system 206 employs a three phase cycle in which recommendations for focused overload control actions are passed to the network traffic manager 208.

The run-time system 206 monitors each local exchange and determines when the BCH along the route from the home trunk exchange of a local exchange exceeds 30 and in which the BCH averaged over trunk primary traffic routes to that home exchange have increased by 40% since the last measuring period. When these conditions are satisfied the run-time system supplies a recommendation to the network traffic manager 208 to apply focus overload controls and in particular, in this embodiment, call gapping to the parent trunks of the local exchange or to far-end trunks of the local exchange affected—assumed for the purposes of the following description to be local exchange 116 of FIG. 1.

It might be noted that it is unlikely that focused overload controls would be applied to both a far-end trunk exchange and a parent exchange since application of a control to the parent exchange makes any control at a far-end trunk exchange redundant.

The run-time system 206 can provide recommendations to the network traffic manager 208 on applying a specific, local focused overload control to the trunk exchanges 102 to 110 to the network 202 according to the present invention. In particular the parent trunk exchange 102 of the local exchange 116 will be subjected to call gapping to numbers of the local exchange 116 once the ASR from the parent trunk exchange to the local exchange 116 has remained at less than 20% for the duration of a five minute measuring period and the BCH along the route from the parent trunk exchange to the local exchange 116 is greater than 10.

The run-time system 206 can alternatively recommend call gapping to numbers of the local exchange 116 at a far-end trunk exchange 106 to 110 of the local exchange 116 when the ASR along the route from the far-end trunk exchange to a parent exchange 102, 104 of the local exchange 116 falls below 45%.

The run-time system 206 will also recommend to the network traffic manager 208 when the call gapping at a given trunk exchange should cease. Advice is given to remove call gapping from a parent trunk exchange 102 of the local exchange 116 once the ASR to the local exchange 116 is greater than 50% and the OCC along the route from the parent trunk exchange to the local exchange 116 is less than 80% for the measuring period, and to remove the call gapping of the far-end trunk exchanges 106 to 110 of the local exchange 116 once the ASR along the route from the far-end trunk exchange to the parent exchange 102 of the local exchange 116 once again rises above 45%.

The run-time system 206 can alternatively also recommend that all focused overload controls are removed once the BCH along the route from a local exchange's home exchange to that local exchange is less than five. This ensures that all controls will be removed under a relevant, overriding condition.

Figure 3:
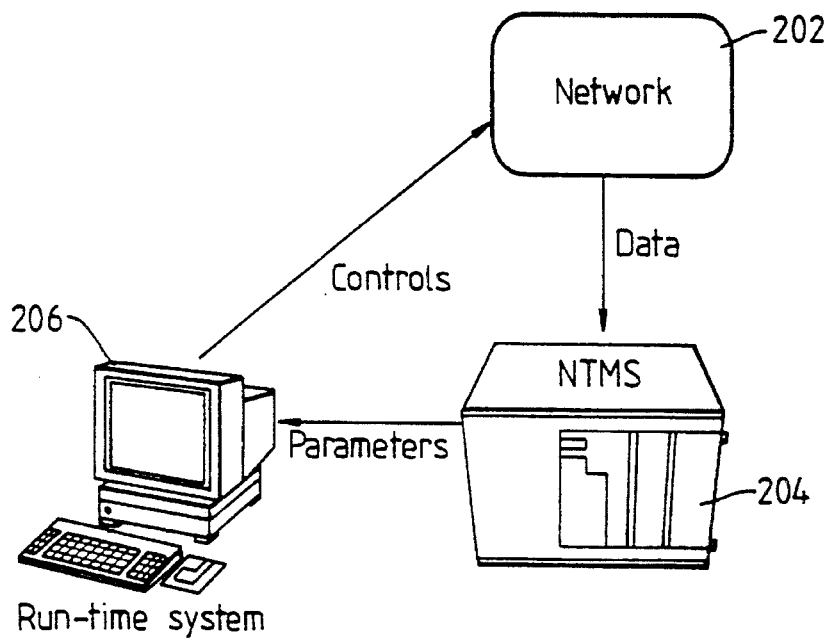
FIG. 3 is a schematic representation of a control system for implementing the method of the present invention using direct control of a network by a computer.

It is envisaged that the run-time system 206 may directly control the network to apply the method of the present invention as shown in FIG. 3 but at present it is expected that it will be necessary to use a network traffic manager 208 to implement of the method of the present invention to allow overriding of the recommendations at his or her discretion.

The method of the present invention has been simulated on a computer representation of BT's UK telecommunications network in which the run-time system 206 comprises a PROLOG-based expert system coded with the rules necessary to provide the recommendations described above in response to the appropriate CCITT parameters from the NTMS 204.

The particular system employed was a QUINTUS PROLOG expert system run on a Sun Sparc station. Parameters generated during real network activity were recorded for the entire GB network for four, 5-minute measurement periods and stored as a data file on the computer.

A C-language program provided an interface between the raw parameters in the computer file and the expert system in that as the expert system required information about the network, the C-language program calculated the data from the raw parameters. The particular thresholds adopted in order to determine when a focused overload condition is likely to occur and when the various call gapping controls are to be applied and relaxed will be set according to the particular network 202 to which the method is to be applied. The present invention is not restricted to any particular values of threshold adopted in the above described specific embodiment.

We claim:

1. A method of controlling a telecommunications network, which includes at least one local exchange connected by routes to one or more parent trunk exchanges each being one of a plurality of trunk exchanges interconnected by trunk routes, said method comprising the steps of:

applying focused overload control to at least one trunk exchange of the network (a) when the Bids per Circuit per Hour (BCH) along a primary traffic route from a parent trunk exchange to the local exchange exceed a first threshold and (b) the magnitude of a decrease in the average Answer Seizure Ratio (ASR) on the trunk primary traffic route to the parent exchange over a measurement period exceeds a second threshold.

2. A method as in claim 1 in which the first threshold is set at approximately the high end of the maximum expected BCH range of the routes in the network.

3. A method as in claim 1 in which the first threshold is 30.

4. A method as in claim 1 in which the second threshold is set equal to the normal daily excursion of the value of the ASR of the routes in the network.

5. A method as in claim 1 in which focused overload controls are applied when the increase in the average value of the BCH along the trunk primary traffic routes into the respective home exchange over a measurement period also exceeds a third threshold.

6. A method as in claim 5 in which the third threshold is 40% greater than the long term BCH average over all the trunk primary traffic routes into the home exchange.

7. A method as in claim 1 in which the focused overload controls are call gapping controls.

8. A method as in claim 1 in which the focused overload controls are removed once the BCH from the parent trunk exchange to the local exchange fall below a fourth threshold.

9. A method as in claim 8 in which the fourth threshold is five.

10. A method as in claim 1 in which the measurement period is approximately five minutes.

11. A method of controlling a telecommunications network as in claim 1 in which said focused overload control is applied to at least one far-end trunk exchange of the local exchange whenever the ASR from the far-end trunk exchange to a parent trunk exchange of the local exchange has also stayed below a seventh threshold for the duration of a measurement period.

12. A telecommunications network including:

at least one local exchange which is connected by routes to one or more home trunk exchanges each being one of a plurality of trunk exchanges interconnected by trunk routes, and control means for applying focused overload controls to the trunk exchanges of the network including a system responsive to the Bids per Circuit per Hour (BCH) along the primary traffic routes from a home trunk exchange to the local exchange and to the magnitude of a decrease in the average Answer Seizure Ration (ASR) on the trunk primary traffic routes into the home exchange over a measurement period to output a signal indicating the need for focused overload controls to be applied to the network by the control means (a) when the Bids per Circuit per Hour (BCH) along the primary traffic routes from a home trunk exchange to the local exchange exceed a first threshold and (b) the magnitude of a decrease in the average Answer Seizure Ratio (ASR) on the trunk primary traffic routes into the home exchange over a measurement period exceeds a second threshold.

13. A telecommunications network including;

at least one local exchange which is connected by routes to one or more home trunk exchanges each being one of a plurality of trunk exchanges interconnected by trunk routes, and control means for applying focused overload controls to the trunk exchanges of the network characterised in that there is included a system responsive to the Bids per Circuit per Hour (BCH) along the primary traffic routes from a home trunk exchange to the local exchange and to the magnitude of a decrease in the average Answer Seizure Ratio (ASR) on the trunk primary traffic routes into the home exchange over a measurement period to cause focused overload controls to be applied to the network by means of the control means when (a) the Bids per Circuit per Hour (BCH) along the primary traffic routes from a home trunk exchange to the local exchange exceed a first threshold and (b) the magnitude of a decrease in the average Answer Seizure Ratio (ASR) on the trunk primary traffic routes into the home exchange over a measurement period exceeds a second threshold.

14. A method of controlling a network, which includes at least one local exchange connected by routes to one or more parent trunk exchanges each being one of a plurality of trunk exchanges interconnected by trunk routes, in which on detection of a focused overload at an exchange call gapping is applied to one or more of the exchanges of the network, the method including the application of call gapping of numbers of a local exchange is applied:

a) to an associated parent exchange whenever the Bids per Circuit per Hour (BCH) from the parent exchange to the local exchange is greater than a fifth threshold and the Answer Seizure Ratio (ASR) on primary traffic routes from the parent exchange to the local exchange has stayed below a sixth threshold for the duration of a measurement period; and b) to a far-end trunk exchange of the local exchange whenever the ASR from the far-end trunk exchange to a parent trunk exchange of the local exchange has stayed below a seventh threshold for a measurement period.

15. A method as in claim 14 in which the call gapping is removed from a parent exchange once the ASR and Percentage Occupancy (OCC) have (a) stayed above an eighth threshold and (b) below a ninth threshold, respectively, for the duration of a measurement period.

16. A method as in claim 15 which call gapping is removed from the far-end exchange once the ASR from the far-End trunk exchange to the parent exchange has stayed above the eighth threshold for the duration of a measurement period.

17. A method as in claim 14 in which the fifth threshold is set to the lower end of the maximum handleable BCH range of the network and above the highest average BCH value of the exchanges in the network.

18. A method as in claim 14 in which the fifth threshold is 10.

19. A method as in claim 14 in which the sixth threshold is set to a value below the normal expected daily minimum of ASR for the network.

20. A method as in claim 19 in which the sixth threshold is 20%.

21. A method as in claim 14 in which the seventh threshold is set to a value approximately equal to the average normal ASR for exchanges in the network.

22. A method as in claim 21 in which the seventh threshold is 45%.

23. A method as in claim 15 in which the eighth threshold is set equal to the highest normal ACR value for the exchanges in the network.

24. A method as in claim 23 in which the eighth threshold is 50%.

25. A method as in claim 15 in which the ninth threshold is set equal to the highest normal OCC for the exchanges in the network.

26. A method as in claim 25 in which the ninth threshold is 80%.

27. A method as in claim 14 in which the measurement period is approximately five minutes.

28. A method of controlling a telecommunications network in which a focused overload is detected as in claim 1 and in which, on detection of a focused overload at an exchange, call gapping is applied in accordance with one of the following specifications:

a) to an associated parent exchange whenever the Bids per Circuit per Hour (BCH) from the parent exchange to the local exchange is greater than a fifth threshold and the Answer Seizure Ratio (ASR) on primary traffic routes from the parent exchange to the local exchange has stayed below a sixth threshold for the duration of a measurement period; and b) to a far-end trunk exchange of the local exchange whenever the ASR from the far-end trunk exchange to a parent trunk exchange of the local exchange has stayed below a seventh threshold for a measurement period.

* * * * *